United States Patent Office 3,387,013
Patented June 4, 1968

3,387,013
SELECTED SALTS OF SUBSTITUTED
3,5-DIMETHYLPHENOLS
Donald W. Kaiser, North Haven, Conn., assignor to Olin
Mathieson Chemical Corporation, New Haven, Conn.,
a corporation of Virginia
No Drawing. Filed Apr. 30, 1965, Ser. No. 452,362
7 Claims. (Cl. 260—429.9)

ABSTRACT OF THE DISCLOSURE

Salts of substituted 3,5-dimethylphenols having the formula

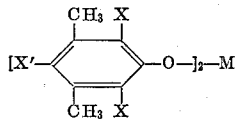

wherein X represents chlorine or bromine; X' is chlorine, bromine or a nitro group; and M is a metal selected from Groups I–B and II–B of the Periodic System are provided by reacting a water soluble salt of the substituted 3,5-dimethylphenol with a water soluble salt having one of the above-mentioned metals as the cation. These salts are useful soil fungicides.

---

This invention relates to selected salts of substituted 3,5-dimethylphenols, and more specifically it relates to salts of 2,4,6-trichloro-3,5-dimethylphenol, 2,4,6-tribromo-3,5-dimethylphenol and 2,6-dibromo-3,5-dimethyl-4-nitrophenol having the following general formula:

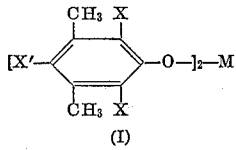

(I)

wherein X represents chlorine or bromine; X' is chlorine, bromine or a nitro group; and M is a metal selected from Groups I–B and II–B of the Periodic System and preferably is either copper, zinc or cadmium. The substituted phenoxides (I) are useful soil fungicides, and they are particularly valuable as specialty foliar fungicides.

The substituted phenoxides (I) are conveniently prepared by reacting a water soluble salt of the substituted 3,5-dimethylphenols with a water soluble salt having one of the above referred to metals as the cation. Generally the alkali metal salts of the substituted 3,5-dimethylphenols are preferred reactants although the ammonium salts may also be utilized in the preparation of the derivatives (I). The salts of this invention are essentially insoluble in water, and precipitate in the aqueous reaction medium when formed. They are readily isolated by filtration or centrifugation procedures.

As mentioned in the above discussion, the compounds (I) are useful as soil fungicides. It has been found that they are active against a variety of soil fungi including *Pythium ultimum*, a fungus which is especially pathogenic to cotton plants. The substituted phenoxides (I) are also active as specialty foliar fungicides, and in this area they are surprisingly selective and effective when used in controlling the cucumber powdery mildew disease.

The salts are advantageously formulated with inert diluents known as carriers and adjuvants for use as soil and specialty foliar fungicides. For instance, they are readily admixed with major portions of solid carriers including inert clays, chalk, and the like to provide powders and dusts which are conveniently applied to the soil or foliage to be protected. Wetting agents may be added to these solid formulations to provide mixtures adaptable for mixing with water to obtain dispersions for spraying. Emulsion concentrates are also easily provided containing the salts as the active fungicidal ingredient.

The following examples will serve to illustrate the preparation of several salts included in the general Formula I.

Example 1

The potassium salt of 2,4,6-trichloro-3,5-dimethylphenol was first prepared by heating a mixture of 90.2 g. (0.40 mole) of 2,4,6-trichloro-3,5-dimethylphenol [prepared by the procedure of Raiford and Kaiser, J. Org. Chem., 4, 555 (1939)], 26.4 g. (0.40 mole) of 85% potassium hydroxide, and 250 ml. of water to boiling. After cooling to room temperature, the colorless crystals were filtered, washed with a small volume of ethanol, and air dried. The salt melted above 300° C. and weighed 83 g., representing a 79% yield.

An amount of 30 g. (0.113) mole of the potassium salt of 2,4,6-trichloro-3,5-dimethylphenol was dissolved in 650 ml. of water, and a solution of 14.0 g. (0.056 mole) of copper sulfate pentahydrate in 100 ml. of water was added. A reddish brown precipitate was obtained, and it was filtered from the reaction medium, washed with water and air dried. The yield was 25 g. or 86% of the theoretical. The following analytical data revealed that cupric 2,4,6-trichloro-3,5-dimethylphenoxide had been obtained.

*Analysis.*—Calcd. for $C_{16}H_{12}Cl_6O_2Cu$: Cl, 40.7. Found: Cl, 40.9.

Example 2

A solution of 35.9 g. (0.10 mole) of 2,4,6-tribromo-3,5-dimethylphenol [prepared by the procedure of Raiford and Scott, J. Org. Chem., 2, 213 (1937)] in 650 ml. of water containing 6.6 g. (0.10 mole) of 85% potassium hydroxide was prepared. To this solution was added a solution of 12.0 g. (0.055 mole) of zinc acetate dihydrate in 150 ml. of water. A nearly colorless precipitate of the zinc salt immediately formed. After filtration, washing with water, and air drying, 33 g. of product, representing an 85% yield, was obtained. The following analytical data revealed that zinc 2,4,6-tribromo-3,5-dimethylphenoxide had been obtained in a purity of 96 percent.

*Analysis.*—Calcd. for $C_{16}H_{12}Br_6O_2Zn$: Br, 61.4. Found: Br, 58.8.

Example 3

A solution of 32.5 g. (0.10 mole) of 2,6-dibromo-3,5-dimethyl-4-nitrophenol [prepared by the procedure of Raiford and Scott, J. Org. Chem., 2, 213 (1937)] in 700 ml. of water containing 6.6 g. (0.10 mole) of 85% potassium hydroxide was prepared. To this solution was added a solution of 13.8 g. (0.055 mole) of copper sulfate pentahydrate in 200 ml. of water. A brown precipitate immediately formed which was filtered from the reaction mixture, washed with water and dried. The following analytical data revealed that cupric 2,6-dibromo-3,5-dimethyl-4-nitrophenoxide had been obtained in high purity. Yield: 92.5%.

*Analysis.*—Calcd. for $C_{16}H_{12}Br_4N_2O_6Cu$: Br, 44.9. Found: Br, 44.9.

Example 4

A solution of 33.8 g. (0.15 mole) of 2,4,6-trichloro-3,5-dimethylphenol in 750 ml. of water containing 9.9 g. (0.15 mole) of 85% potassium hydroxide was prepared. To this solution was added a solution of 16.5 g. (0.075 mole) of zinc acetate dihydrate in 100 ml. of water. An off-white precipitate immediately formed upon addition, and this precipitate was filtered with suction, washed with water, and air dried. The following analytical data revealed that zinc 2,4,6-trichloro-3,5-dimethylphenoxide had been obtained. Yield: 97.5%.

*Analysis.*—Calcd. for $C_{16}H_{12}Cl_6O_2Zn$: Cl, 40.6. Found: Cl, 39.3.

Example 5

A solution of 35.9 g. (0.10 mole) of 2,4,6-tribromo-3,5-dimethylphenol in 650 ml. of water containing 6.6 g. (0.10 mole) of 85% potassium hydroxide was prepared. To this solution was added a solution of 13.8 g. (0.055 mole) of copper sulfate pentahydrate in 150 ml. of water. A red-brown precipitate formed upon addition, and this solid material was filtered from the reaction mixture, washed with water and dried. The following analytical data revealed that cupric 2,4,6-tribromo-3,5-dimethylphenoxide had been obtained. Yield: 83%.

*Analysis.*—Calcd. for $C_{16}H_{12}Br_6O_2Cu$: Br, 61.5. Found: Br, 61.3.

Example 6

A solution of 32.5 g. (0.10 mole) of 2,6-dibromo-3,5-dimethyl-4-nitrophenol in 700 ml. of water containing 6.6 g. (0.10 mole) of 85% potassium hydroxide was prepared. To this solution was added a solution of 12.0 g. (0.055 mole) of zinc acetate dihydrate in 200 ml. of water. A light yellow precipitate formed and was filtered with suction, washed with water and dried. The following analytical data revealed that zinc 2,6-dibromo-3,5-dimethyl-4-nitrophenoxide had been obtained. Yield: 92.5%.

*Analysis.*—Calcd. for $C_{16}H_{12}Br_4N_2O_6Zn$: Br, 44.8. Found: Br, 42.0.

What is claimed is:

1. Substituted phenoxides having the formula:

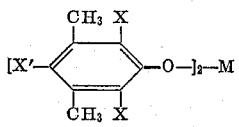

where X is selected from the group consisting of chlorine and bromine;
where X' is selected from the group consisting of chlorine, bromine and nitro; and
where M is a metal selected from the Groups I–B and II–B of the Periodic System.

2. Cupric 2,4,6-trichloro-3,5-dimethylphenoxide.
3. Zinc 2,4,6-tribromo-3,5-dimethylphenoxide.
4. Cupric 2,6-dibromo-3,5-dimethyl-4-nitrophenoxide.
5. Zinc 2,4,6-trichloro-3,5-dimethylphenoxide.
6. Cupric 2,4,6-tribromo-3,5-dimethylphenoxide.
7. Zinc 2,6-dibromo-3,5-dimethyl-4-nitrophenoxide.

References Cited

UNITED STATES PATENTS

| 2,252,663 | 8/1941 | Reiff | 260—429 |
| 2,331,268 | 10/1943 | Flenner. | |
| 2,886,580 | 5/1959 | Hintzmann et al. | 260—438.1 |
| 2,429,086 | 10/1947 | Anderson | 260—433 |
| 3,346,447 | 10/1967 | Wright | 260—429 XR |
| 1,994,002 | 3/1935 | Mills | 260—429.9 |
| 2,071,822 | 2/1937 | Ellis | 260—429.9 |
| 2,197,833 | 4/1940 | Reiff | 260—429.9 |
| 3,308,082 | 3/1967 | Pauli et al. | 260—438.1 XR |

TOBIAS E. LEVOW, *Primary Examiner.*

H. M. S. SNEED, *Assistant Examiner.*